United States Patent [19]

Johnson

[11] 4,417,631
[45] Nov. 29, 1983

[54] ZERO TRACKING CIRCUIT FOR ELECTRONIC WEIGHING SCALE

[75] Inventor: James Johnson, Webster, Tex.

[73] Assignee: Sensor Developments, Inc., Lake Orion, Mich.

[21] Appl. No.: 335,110

[22] Filed: Dec. 28, 1981

[51] Int. Cl.³ .................. G01G 3/14; G01G 13/14
[52] U.S. Cl. .................. 177/210 FP; 177/1; 177/165; 177/DIG. 3
[58] Field of Search .............. 177/1, 25, 165, 210 FP, 177/DIG. 3; 364/567, 568

[56] References Cited

U.S. PATENT DOCUMENTS

| | | | |
|---|---|---|---|
| 3,662,845 | 5/1972 | Pratt | 177/210 FP X |
| 3,709,309 | 1/1973 | Williams, Jr. et al. | 177/DIG. 3 |
| 3,812,923 | 5/1974 | Rock | 177/165 X |
| 3,979,055 | 9/1976 | Fathauer et al. | 364/567 X |
| 4,139,892 | 2/1979 | Gudea et al. | 177/25 X |
| 4,294,320 | 10/1981 | Bilstad et al. | 177/DIG. 3 |

Primary Examiner—George H. Miller, Jr.
Attorney, Agent, or Firm—Cullen, Sloman, Cantor, Grauer, Scott & Rutherford

[57] ABSTRACT

A zero tracking circuit (32) monitors the output of an electronic scale employing a dual slope integrating type analog-to-digital converter (20) to detect low magnitude output signal levels characteristic of drift and other low level noise. The converter (20) samples the magnitude of an input analog signal proportional to applied weight and in response controls a count accumulated in a resettable up/down counter (36). The counter (36) is manually reset to provide tare, that is, to provide a zero reading with an applied weight. The output of the counter (36) is supplied to a digital display (40a–40d) that displays changes in applied weight. The zero tracking circuit (32) includes a decoder (56) that monitors the output of the counter (36) and in response to low magnitude counts characteristic of drift, e.g., one count on each side of zero, resets the counter (36) to eliminate the drift.

10 Claims, 7 Drawing Figures

ZERO TRACKING CIRCUIT FOR ELECTRONIC WEIGHING SCALE

TECHNICAL FIELD

The present invention relates generally to zero tracking in analog-to-digital conversion systems and more particularly toward a zero tracking circuit in a dual slope integrating type weighing scale having pushbutton tare.

BACKGROUND ART

To improve accuracy and enable ease in output interpretation, weighing scales have been developed using electronic circuitry that receives an analog signal generated by a weight-responsive transducer and converts the analog signal to a corresponding digital signal. The digital is applied in decimal format to a display such as light emitting diode or liquid crystal array. In one type of scale used in portion weighing, pushbutton tare is provided; with any tare weight on the scale, the display can be reset to zero and thereafter reads only weight added or removed. A resettable up/down counter is controlled by a dual slope integrator to successively up count and down count pulses generated by a clock source. The integrator in turn successively up integrates for a fixed time toward the magnitude of the voltage sample and down integrates at a fixed slope toward zero. At zero crossover of the down integrate signal, the counter output, which is proportional to input voltage, is latched for display. The count is reset to zero by operation of a tare switch and thereafter, accumulated count is proportional to change in applied weight, i.e., weight added or weight removed.

Weight to voltage transducers such as strain gauges typically used in electronic weighing scales generate a low level voltage that is linear with applied force within a voltage range on the order of two or three millivolts per 0.1 ounce of applied weight. Low frequency signal-to-noise ratio of analog to digital conversion circuitry operative with applied signals within that range is limited by factors such as thermal drift, slowly changing electrical and mechanical bias and varying environmental conditions such as air currents, temperature and humidity changes. As a result of this low level, low frequency noise, the reading of the digital display typically will drift from zero to indicate an error of one or more digits in each direction. For example, whereas a typical four digit display reading with no applied weight on the scale or with an applied weight at tare would be 000.0, the display in practice may read +000.1 or more in presence of normal drift. Although this output error is relatively small, a user in a commercial environment may consider any non-zero reading with no applied weight or at tare to be intolerable.

One object of the invention, therefore, is to provide automatic zero tracking in an analog to digital conversion system.

Another object is to provide automatic zero tracking in an electronic weighing scale incorporating an analog to digital converter system to develop a digital output reading proportional to applied weight.

Another object is to provide an automatic zero tracking circuit in an analog-to-digital conversion system employing a dual slope integrating type analog-to-digital converter driving a resettable up/down counter that accumulates counts proportional to input voltage magnitude.

Another object is to provide an electronic weighing scale wherein the display output is maintained at zero independently of drift and other low level noise.

Another object is to provide an electronic weighing scale of the type employing a dual slope integrating type analog-to-digital converter driving a resettable up/down counter wherein drift and other low level noise are automatically compensated to provide a continuous zero output display with no applied weight or at tare.

Another object is to provide an electronic weighing scale having an automatic zero tracking circuit to display a zero output with no applied weight or at tare independently of drift or other low level noise and wherein the zero tracking circuit distinguishes between drift and change of applied weight.

DISCLOSURE OF INVENTION

A zero tracking circuit in a dual slope integrating analog-to-digital converter circuit, which may be used in a weighing scale to measure an applied weight for digital display, comprises a decoder to monitor low level counts at the output of the converter that are characteristic of drift and other low level noise and, in response, to reset or "tare" the output of the converter. The analog-to-digital converter incorporates a dual slope integrator that integrates in one direction for a fixed time duration at a slope proportional to applied voltage magnitude and then in an opposite direction toward zero at a fixed slope for a time duration proportional to the magnitude of the input voltage. Clock pulses, controlled by the integrator are applied to a counter to successively up count for a fixed duration and down count for a duration proportional to magnitude of the applied voltage. The resultant or residual count in the counter at the end of each conversion cycle is proportional to input voltage magnitude (weight). A pushbutton tare zeros the counter; subsequent residual counts accumulated in the counter are proportional to increases or decreases of applied weight.

The decoder of the zero tracking circuit comprises an array of gates responsive to the counter output to detect very low counts within a small window about zero, e.g., between +000.1 and −000.1. In response to low ouput count, characteristic of drift, the counter is reset to eliminate the drift component in the display. To prevent premature zero tracking whereby the counter would be reset to zero as it passes through the window in response to an applied weight, the counter is reset only if its output count remains within the window for a predetermined time period. During zero tracking, the display is pulled to zero to eliminate the appearance of flicker.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various, obvious respects, all without departing from the invention. Accordingly, the drawings and description are to be regarded as illustrative in nature, and not as restrictive.

BEST MODE FOR PRACTICING THE INVENTION

Figure 1:
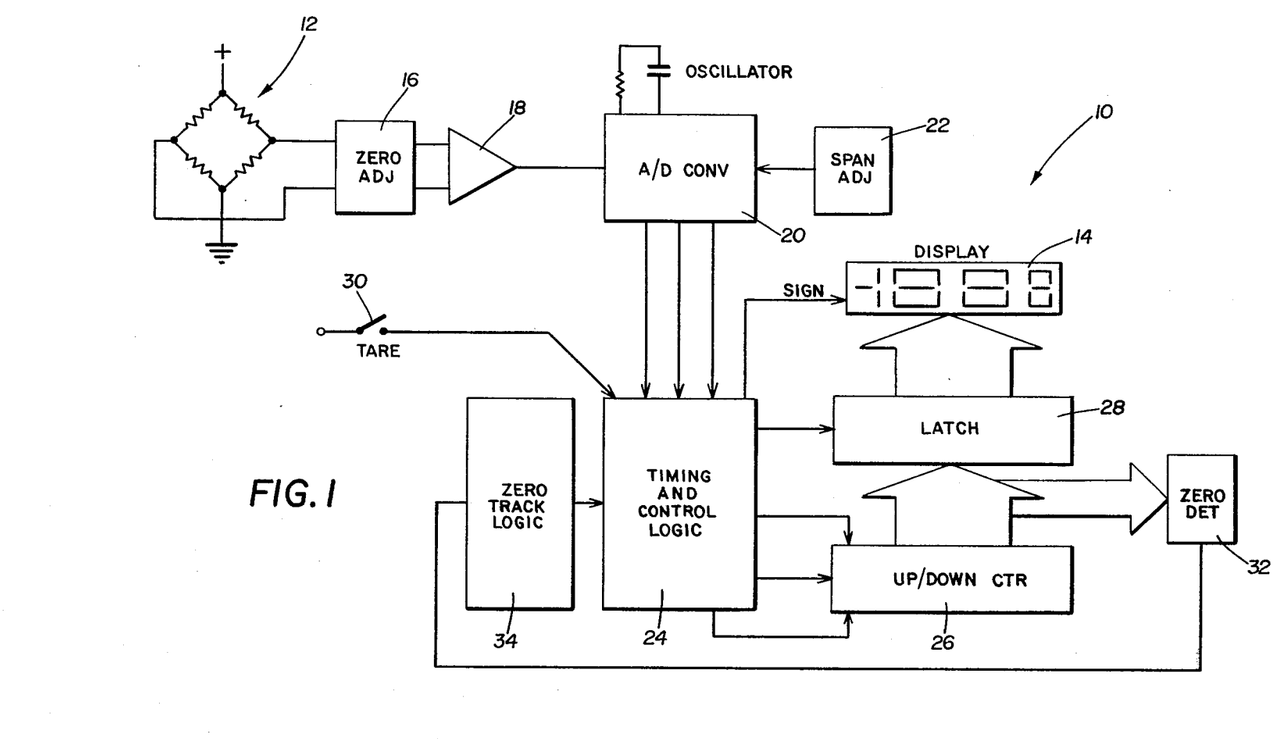
FIG. 1 is a simplified block diagram illustrating a preferred embodiment of the invention applied in a weighing scale environment.

With reference to FIG. 1, circuit 10 monitors the analog output signal developed by a bridge 12 and in response develops a corresponding digital signal to be displayed in base ten format on display 14. Although the analog signal applied to circuit 10 is illustrated as a bridge signal, it is to be understood that the circuit is operative with analog signals developed by any other source of such signals. The digital display 14 may be of any suitable type, such as a conventional liquid crystal or light emitting diode array.

In accordance with a preferred embodiment, the bridge 12 is a strain gauge type force transducer in a conventional Wheatstone bridge configuration adapted to develop an analog voltage proportional to the weight of an object applied to the transducer. In practice, the voltage developed by transducer 12 is on the order of 2 or 3 microvolts per unit of applied force (0.1 ounce). The bridge voltage is zero adjusted by a zero adjust circuit 16 such that the bridge is in balance with no applied weight. The zero adjust circuit 16 is periodically manually adjusted to compensate for bridge imbalance due to component tolerances and environmental effects. The zero adjusted signal developed by bridge 12 is amplified by operational amplifier 18 and applied as an input to an analog to digital (A/D) converter 20. The applied analog signal is span adjusted by span adjust circuit 22 such that the full range of voltages developed by bridge 12 is within the full scale voltage of the analog-to-digital converter 20.

The analog-to-digital converter 20 is preferably of a conventional dual slope integrating type, such as the Intersil ICL 7109 integrated circuit which is a 12 bit, three phase, dual slope integrating type analog-to-digital converter on a single chip. The chip in one mode of operation generates timing signals to control an external counter to accumulate counts proportional to the magnitude of input analog voltage samples. Details of the structure and operation of the converter 20 are provided in Intersil ICL 7109 specification 7-79-00B incorporated herein by reference. Briefly, however, control signals generated by the analog-to-digital converter 20 are applied to a timing and control network 24 which controls up and down counting of counter 26 synchronously with conversion cycles developed by converter 20. Timing and control logic circuit 24 also supplies control signals to latch 28 at the end of each conversion cycle to apply the output count of counter 26 in display 14.

The timing and control logic circuit 24 is provided with tare, that is, the capability to reset the up/down counter 26 to zero by closing a local or remote tare switch 30. In tare, with the counter 26 reset, the display 14 will display all zeroes and thereafter will display only the amount of change of an applied weight or analog signal responsive to some other parameter; a positive display is developed in response to weight added and a negative display is developed in response to weight removed.

Dual slope integrating analog to digital converters are known in prior art such as Ammann U.S. Pat. No. 3,316,547; application of such converters in a tare type weighing scale environment is also known (Intersil application note by J. D. Watson dated Sept. 7, 1979). The present invention is concerned with automatic zero tracking in such circuitry to eliminate drift in the digital display which in practice develops as a result of changes in internal offset voltages, component variations and other factors that vary over time and in response to environmental changes.

The circuitry shown in block diagram form in FIG. 1 now shall be described in more detail in connection with FIGS. 2 and 3. Considering FIG. 2 in overview, zero tracking circuit 31 comprises zero detector or decoder 32 and zero tracking logic circuit 34 to identify digital output counts developed by counter 26 indicative of drift or other low magnitude, low frequency noise and in response resets or "tares" the counter. The assumption applied in developing the zero detection circuitry is that any very low magnitude output count on either side of zero of counter 26 is presumed to represent drift or other noise and not to represent an applied weight. Additional logic circuitry to be described later within the zero tracking circuit distinguishes between this type of noise and transient shifts in output count in response to changes in applied weight. Additional circuitry also to be described later pulls to zero any spurious reading, such as +000.1 or −000.1 during zero tracking to eliminate display flicker.

Figure 2:
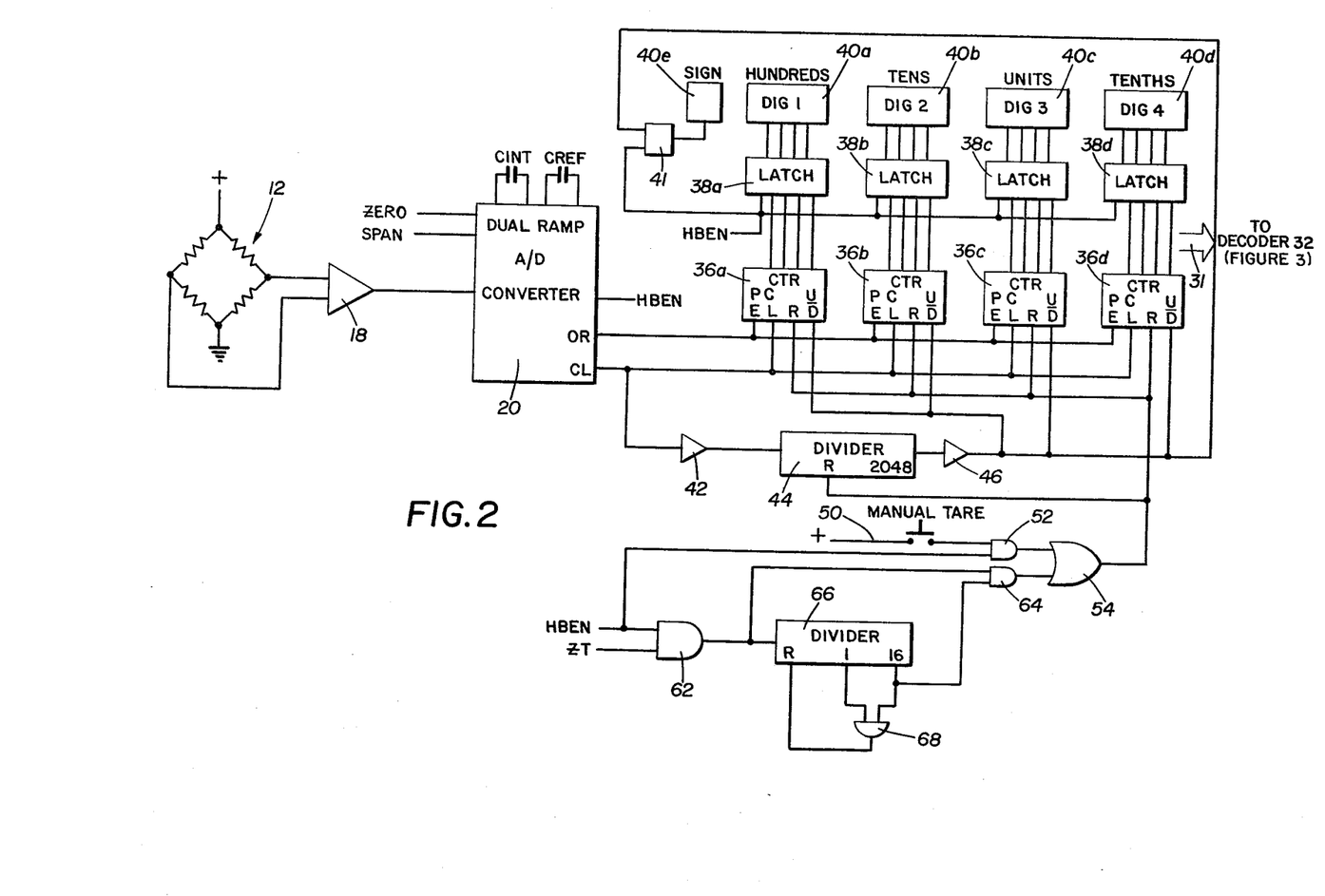
FIG. 2 is a more detailed diagram of the circuit shown in FIG. 1.

Referring now to FIG. 2 in more detail, the dual slope integrating type analog-to-digital converter 20 receives an analog voltage developed by Wheatstone bridge 12 in response to applied weight and amplified by operational amplifier 18. The converter 20 processes the analog input signal by sampling the magnitude of the input signal and in response generates a high byte enable signal HBEN (see Intersil specification, supra) at positions in time that depend upon the magnitudes of respective input voltage samples. The converter 20 contains an internal clock that operates at a frequency of approximately 17,554 Hz and is available at output terminal CL. Clock pulses are applied from terminal CL to the corresponding clock input terminals CL of cascaded up/down counters 36a–36d. The counters 36a–36d, which may each be a CD4510 manufactured by National Semiconductor Corp., provide a BCD output count that is periodically latched respectively in latches 38a–38d (CD 4511) to be displayed in display units 40a–40d in addition to sign (+ or −) that is displayed in display unit 40e. Each stage of the up/down counter 36a–36d includes an input terminal PE that drives all counters 36a–36d to "1" and disables the display in response to an overrange generated by converter 20; overrange indicates that the voltage developed by amplifier 18 is larger than the voltage that may be applied to the ICL 7109 converter. The R input terminal of each one of the counters 36a-36d is a reset terminal that resets all outputs of the counters to zero; terminals U/D are up/down control terminals that, depending upon the applied counter control voltage state (logic one or logic zero), control each counter stage to up count or down count.

The clock signal generated by converter 20, besides being supplied to the CL terminals of counter 36a-36d, is supplied through an inverter 42, to a divider circuit 44 which is internally programmed to divide the clock frequency by a factor of 2048. Thus, the output of divider 44 is a square wave of successive logic one and logic zero states for 2,048 clock pulse periods. This signal is supplied, through inverter 46, to the U/D input terminals of counters 36a-36d. Accordingly, the counters 36a-36d are controlled to up count for a duration of 2,048 pulses while the U/D terminal is at "1" and to thereafter down count for a similar duration of 2,048 pulses while U/D is at "0", and so on. The output of counters 36a-36d thus follows a triangular digital waveform with a peak to peak magnitude of 2,048 counts.

The operation of dual slope integrating A/D converter 20 is illustrated in detail in FIGS. 4a-4e wherein it is assumed that the scale is in tare. Converter 20 receives an analog weight responsive voltage signal from the output of transducer bridge 12 and amplifier 18 as mentioned above. In response, converter 20 develops high byte enable (HBEN) signals which are synchronized to the clock pulses CL and are spaced apart by times proportional to the magnitudes of the input voltage samples. The converter 20 operates in three successive phases during each measurement cycle: a first phase, or auto-zero (AZ) phase, an integrate phase and a deintegrate phase. During the auto-zero phase (Phase I), various operations in connection with initialization of the converter take place. The signal input terminals are temporarily internally short circuited to analog ground, a reference capacitor CREF (FIG. 2) is charged to a reference voltage and a feedback loop is closed to compensate for internally developed offset voltages. During the signal integrate phase (Phase III), the input short circuit is removed and the input voltage is integrated across capacitor $C_{int}$ (FIG. 2) for a fixed time period of 2,048 clock pulses and at the end of this phase, the polarity of the integrated signal is determined. During the deintegrate phase (Phase III), the voltage on $C_{int}$ is now deintegrated at a fixed slope toward zero (analog ground). The time required for the voltage across capacitor $C_{int}$ to cross zero is proportional to the magnitude of the input voltage to the converter 20.

Figures 4A, 4B:
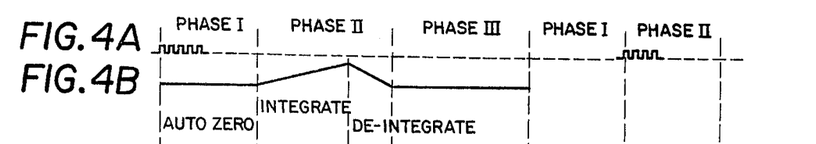
FIGS. 4a–4e are waveforms illustrating the operation of the circuit shown in FIGS. 1-3 at tare.

The converter 20 generates a signal HBEN coincident with the clock pulse following zero crossover of the deintegrate voltage. This HBEN signal, also termed E.O.C. (end of conversion) is applied to the control inputs of latches 38a-38d to latch the output count of counters 36a-36d for display in units 40a-40d. Pulses generated by the internal 17,554 Hz clock of converter 20 are shown in FIG. 4a. The integrator waveform developed within converter 20, as shown in FIG. 4b, is in the auto-zero phase for at least 2,048 clock pulses, with the deintegrate portion extending for a period up to 4,096 pulses, depending upon the time at which zero crossing occurs.

Figures 4C, 4D:
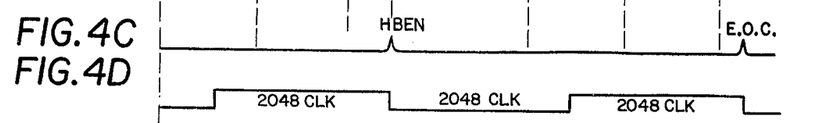
Figure 4E:
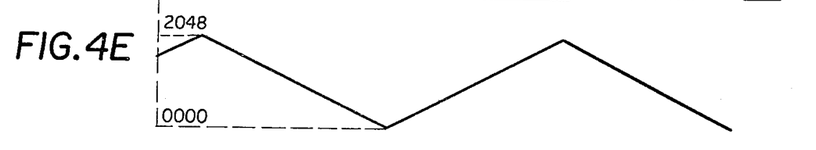

FIG. 4d illustrates the output of divider 44 which generates a square wave having a half period of 2,048 clock pulses to control count direction of counter 36a-36d as shown in FIG. 4e. FIG. 4e illustrates the digital output of counter 36a-36d as it follows a triangular trajectory between the counts 0000 and 2048. It is noted that because there is a logic inversion in inverter 46 (FIG. 2), when the FIG. 4d waveform (output of divider 44) is at logic one, the counter 36a-36d is down counting whereas when the output of the divider is at logic zero, the counter up counts. The end of conversion signals HBEN generated by converter 20 are coincident with the minimum of the counter waveform at 0000 because there is no load on the scale or the scale reading has been reset (tare). As will be discussed below in connection with FIGS. 5a-5f, any change in weight relative to tare will time shift the HBEN signal to latch a non-zero count in latches 39a-38d for display in units 40c-40d.

As mentioned above, counters 36a-36d are resettable by applying a logic one reset signal to terminals R. The counters 36a-36d are manually reset using switch 50 which may be a hand or foot operated switch or a remote switch. Closure of switch 50 develops the logic one reset signal which is applied to one input of AND gate 52. The other input of AND gate 52 receives the HBEN signal developed by converter 20, and upon coincidence, a logic one reset signal is applied through OR gate 54 to the reset terminals R of counters 36a-36d as well as to reset terminal R of counter control divider 44. The outputs of counters 36a-36d will accumulate counts proportional to weight added to or weight removed from the weighing scale.

Figure 5A:
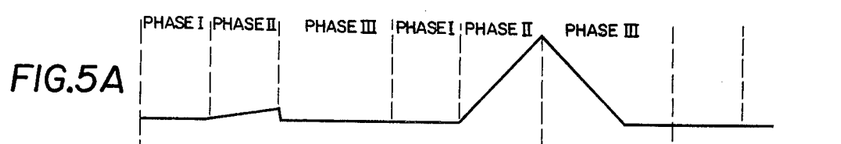
FIGS. 5a–5f are waveforms illustrating zero tracking during operation of the circuitry in response to added weight.
Figure 5B:
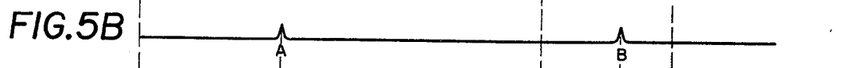

Operation of the circuit in FIG. 2 in a tare, or zeroing operation followed by a weighing cycle can be best understood with reference to FIGS. 5a-5e. FIG. 5a illustrates the integrator waveform within converter 20 during two successive conversion cycles. It is assumed that during the first conversion cycle, the manual tare switch 50 is closed to zero the output reading of the scale carrying a product to be weighed and thereafter during a second conversion cycle, a portion weight increase of 185.7 ounces is measured and displayed.

Thus, referring to FIG. 5a, during the first cycle, consisting of phases I, II and III, the first phase is the auto-zero phase which as mentioned earlier extends in time for at least 2048 clock pulses. During phase II, the internal integrator up integrates toward and with a slope proportional to the magnitude of input voltage of the converter for a period of 2048 clock pulses. This input voltage is a function to the applied weight. Thereafter, the integrator down integrates at a fixed slope towards zero. During phase I, the counter control signal applied to the U/D terminals of counters 36a-36d is at logic one controlling the counters to up count, as shown in FIG. 5d. Thereafter, at the end of 2048 counts, developed by the output of divider 44, the counter control signal is at logic zero controlling counters 36a-36d to down count.

Assume that the manual tare switch 50 is closed at time A (FIG. 5b); the output of OR gate 54 develops an HBEN signal upon coincidence of the corresponding HBEN signal (end of conversion) generated by converter 20 and closure of switch 50. This pulse is applied to reset counters 36a-36d and divider 44. Thus, in FIG. 5c, the counter control waveform is shortened (reset to zero) at time A and similarly output of counters 36a-36d is reset to zero (FIG. 5d). The display units 40a-40d display a 000.0 count.

Figure 5C:
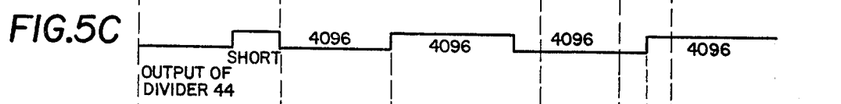
Figure 5D:
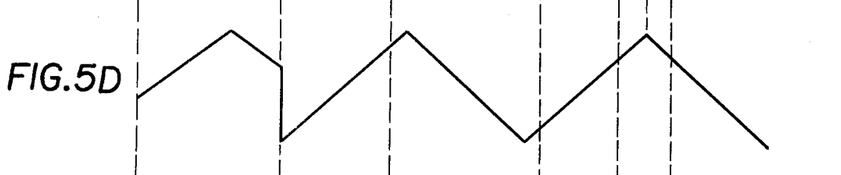
Figure 5E:
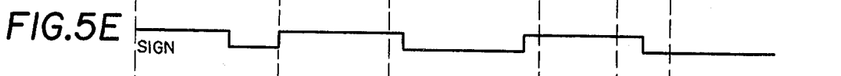
Figure 5F:
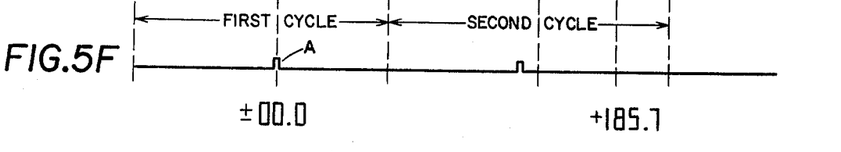

During the second measurement cycle, beginning with the second Phase I interval shown in FIGS. 5a-5f, auto-zero occurs during Phase I, as described above. During Phase II, the integrator within converter 20 up integrates at an input voltage dependent slope for a period of 2048 clock pulses and then during Phase III down integrates toward zero at a fixed slope. Zero crossover occurs at a time dependent upon the magnitude of the input voltage (applied or removed weight). Upon zero crossover by the deintegrate signal, a second end of conversion signal HBEN is generated by converter 20 at time B in FIG. 5b. This HBEN signal is applied to latches 38a–38d to store the count developed by counter 36a–36d for display in display unit 40a–40d. Be there has been no closure of tare switch 50, counters 36a–36d are not reset and continue to successively upcount and downcount as shown in FIGS. 5c and 5d. Thus, in the present example, the instantaneous count of 185.7 stored in counters 36a–36d is displayed in display units 40a–40d.

Figure 6A:
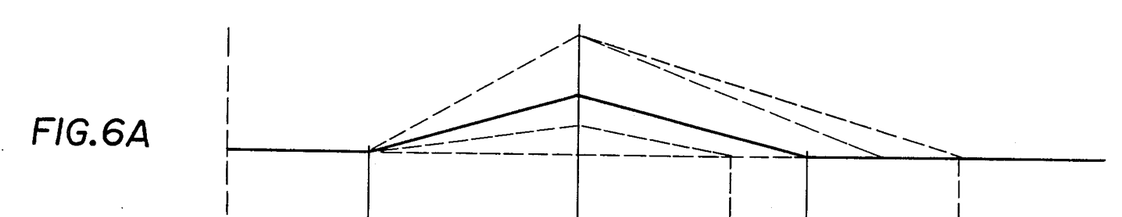
FIGS. 6a–6d are waveforms illustrating in more detail operation of the circuit in response to added or removed weight relative to tare.
Figure 6B:
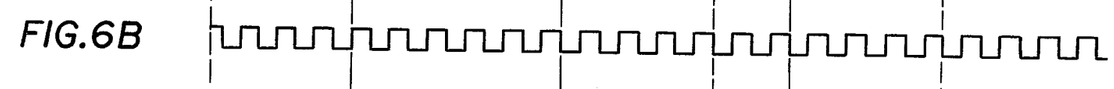
Figure 6C:
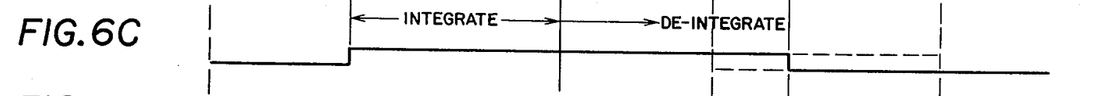
Figure 6D:
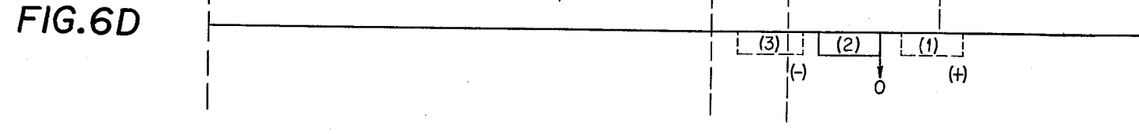

Referring to FIGS. 6a–6d, the tare function of the circuit 10 shown in FIGS. 1 and 2 can be better understood. With reference to FIG. 6a, assume that the tare switch 50 has just been closed and that no weight has been added to or removed from the scale. The integrator waveform with tare weight, that is, with no weight added to or removed from the scale following closure of tare switch 50 is shown in solid line. FIG. 6b shows the clock pulses generated by converter 20 and FIG. 6c shows the operating status of the converter; when the status waveform is at logic one, the converter is in an up integrate or down integrate mode. The end of conversion of HBEN signal generated by converter 20 is shown in FIG. 6d. Overtare (weight added to the scale) is shown in dotted line in the Figures, whereas undertare (weight removed) is represented by dashed line.

In accordance with operation of the converter 20, and in accordance with Intersil ICL 7109 specification, end of conversion pulse HBEN is generated one clock pulse after zero crossover of the down integrate signal. Thus, with respect to a tare weight, HBEN signal (1) is initiated one clock pulse following zero crossover of the solid line down integrate signal shown in FIG. 6a. While the output of counter 36a–36d passes through zero as it successively up counts and down counts to define the triangular waveform of FIG. 4e, the trailing edge of the HBEN signal latches the instantaneous output of counters 36a–36d at a zero count.

In response to overtare, that is, wherein product to be weighed is added to the scale following tare, the zero crossover point of the deintegrate waveform shown in FIG. 6a is delayed in time causing the HBEN signal to latch the output of counters 36a–36d slightly later in time shown as signal (2) in FIG. 6d to supply a positive count to be displayed in units 40a–40d.

Similarly, in response to undertare, that is, wherein product has been removed from the scale following tare, zero crossover of the deintegrate waveform occurs slightly earlier, as shown by HBEN signal (3) in FIG. 6d. This early HBEN signal latches a negative count in counters 36a–36d, that is, the count that has accumulated within counters prior to zero crossover, into latches 38a–39d for display in display units 40a–40d. The sign (+, −) of the count is displayed in display unit by flip flop 41 responsive to the counter control signal developed by divider 44.

Figure 7:
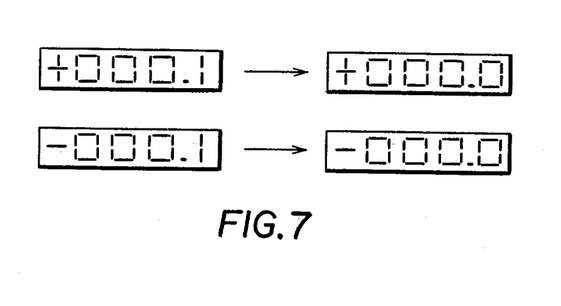
FIG. 7 illustrates a pair of displays showing drift as well as zero tracking in accordance with the invention.

As mentioned above, upon tare, the output display is units 40a–40d is zero, that is, 000.0 in the present example. Because there is a tendency for the output display to drift somewhat as a function of component value drift and changes in ambient conditions, however, the display has a tendency to develop a non-zero digital output, that is +000.1, −000.1, etc. Examples of displays exhibiting drift are shown in the left-hand side of FIG. 7. As a practical matter, display readings of this magnitude, that is, on the order of one tenth ounce, will typically be representative of drift rather than of the weight of applied or removed product.

In accordance with the present invention, the outputs of counters 36a–36d are monitored by a decoder and if the output count is determined to be within a window of +000.1 to −000.1, any non-zero count in the display is considered to constitute drift and the counter 36a–36d is reset to zero (tared) to reestablish a 000.0 display. In other words, the decoder detects a three count window, i.e., whether the output display is +000.1, 000.0 or −000.1 and in response, generates a zero track signal that places the scale in tare.

Figure 3:
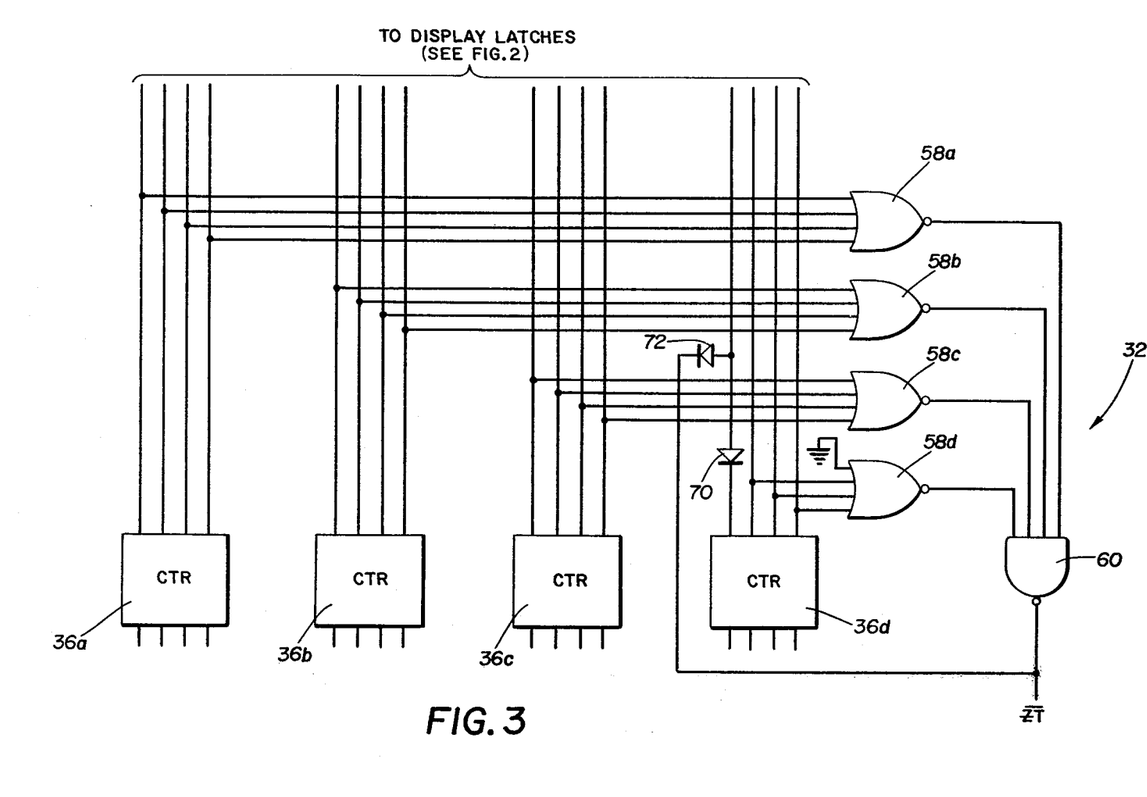
FIG. 3 is a circuit diagram of the decoder network shown in FIG. 2.

Thus, referring to FIG. 3, decoder 56 comprises a set of NOR gates 58a–58d having four inputs each connected respectively to the four outputs of successive counter stages 36a–36d. Gate 58a generates a logic one output only if all four outputs of counter 36a are at logic zero, that is, if the output of counter stage 36a is at zero. Similarly, gates 58b and 58c generate zero outputs. Gate 58d, however, has only three inputs connected to outputs of counter 36b. The fourth input is grounded. Gate 58b will therefore generate a logic one signal if the outputs of counter stage 36d are 0000 to 1000 (the 1 represents the least significant bit in this format). NAND gate 60 thus generates a logic zero signal only in response to output counts of 0000 or 0001 (independent of polarity).

When the output display in decimal format is 000.1, the output of gate 60 generates a zero track (ZT) signal that is applied to one input of AND gate 62 in FIG. 2. To the other input of AND gate 62 is applied the end of conversion signal HBEN. Thus, during the presence of a zero track (ZT) signal, a pulse is generated by gate 62 at the end of each conversion cycle. This output pulse is applied to one input of AND gate 64 as well as to the input of divide by sixteen divider 66.

Divider 66 generates an output pulse at its divide by sixteen terminal upon the sixteenth conversion cycle in the presence of a zero track signal. The output pulse developed by divider 66 is applied to the second input of gate 64 which in turn supplies a pulse through OR gate 54 to reset counters 36a–36d. Divider 66 also resets itself through AND gate 68 having inputs connected to the divide by one and divide by sixteen outputs of counter 66.

The purpose of divider 66 and associated circuitry is to slow down zero tracking, that is, to avoid resetting the scale as the display passes through zero to a weight corresponding to weight added to or removed from the scale. The divider 66 thus passes a zero track signal to reset counters 36a–36d only if the output of the counter is within the three count window for a period of time corresponding to sixteen successive cycles of converter 20. In the present example, the cycle time is approximately one-half second; zero tracking occurs if only the display output is within the three count window for a duration of eight seconds.

The output display has a tendency to flicker between +000.1 and during zero tracking as the zero tracking circuit responds to drift to periodically zero the display. To eliminate this tendency, a pair of diodes 70 and 72 are provided in the least significant bit line of counter stage 36d. The anode of diode 72 is connected to the least significant bit line of counter 36d and the cathode is connected to the output of gate 60. Diode 70 isolates the output of counter 36d from the output of gate 60. Thus, when the output of gate 60 is at logic zero, indicating that the count of counters 36a–36d is within the three count window, the output display is pulled by diode 72 to 000.0. In other words, a logic one count on the least significant bit line of counter 36d is pulled to zero to establish a 0 as the least significant bit. It is pointed out that in this condition, the least significant bit developed by counter stage 36d is a "1" while the corresponding display unit 40d develops a "0".

Thus, in accordance with the invention described above, a conventional dual slope integrating type analog-to-digital converter system applied in a weighing scale environment (the application of the present invention is, of course, not limited to this environment) is provided with a novel zero tracking circuit that operates together with conventional tare circuitry to automatically zero track the output of the converter, that is, to rezero the output display in response to drift or other low magnitude output variations. The circuitry establishes a three count window (the number of counts defining the window being arbitrary) and, if the digital output of the converter is within this count for at least a predetermined time period (eight seconds for the present example), the output is zero reset on the assumption that the non-zero output count is representative of drift and not of applied or removed weight. To eliminate display flicker, a diode network pulls the output display to zero during zero tracking.

In this disclosure, there is shown and described only the preferred embodiment of the invention, but as aforementioned, it is to be understoood that the invention is capable of use in various other combinations and environments and is capable of changes or modifications within the scope of the invention concept as expressed herein.

I claim:

1. In a weighing device including a weight transducer for developing an analog electrical signal proportional to an applied weight, converter means for converting the analog weight signal to a corresponding digital output signal, said converter means including resettable counter means for accumulating a count as a function of said weight signal, and a digital display for displaying said output count, the improvement comprising:

a zero tracking circuit including decoder means responsive to an output of said counter means for detecting a low magnitude counter output that is characteristic of drift and means responsive to said decoder means for resetting said counter means, said resetting means including means responsive to said decoder means for generating reset pulses identifying low magnitude counter outputs characteristic of drift, accumulator means for accumulating said reset pulses and means responsive to a predetermined number of reset pulses in said accumulator means for resetting said counter means.

2. A circuit for digitally displaying the magnitude of an input analog signal comprising a source of clock pulses, means for generating a timing signal proportional to the instantaneous magnitude of the input signal, resettable up-down counter means responsive to the timing signals for successively upcounting and downcounting clock pulses and means responsive to said timing signal for latching an output count of said counter means; decoder means for monitoring the output count at a time whereat said count is proportional to the input signal magnitude; means for displaying said output count at said time and means responsive to said decoder means for resetting said counter means when said output count at said time has a value that is characteristic of drift, said resetting means including means responsive to said decoder means for generating reset pulses identifying a low magnitude counter output characteristic of drift, accumulator means for accumulating said reset pulses and means responsive to a predetermined number of reset pulses in said accumulator means for resetting said counter means.

3. A circuit for digitally displaying the magnitude of an input analog signal, comprising a source of clock pulses; dual slope integrating analog to digital converter means responsive to said input signal, said converter means including a dual slope integrator means, up-down counter means, means for controlling said counter means to successively upcount and downcount clock pulses; means responsive to said integrating means to latch an output count of said counter means at a display time whereat said output count is proportional to input signal magnitude; latch means for storing digital signals developed by said counter means at said display time; means for displaying contents of said latch means; said circuit further comprising decoder means for monitoring the count at said display time and means responsive to an output of said decoder means for resetting said counter means when said count at said display time has a magnitude characteristic of drift, said resetting means including means responsive to said decoder means for generating reset pulses identifying low magnitude counter outputs characteristic of drift, accumulator means for accumulating said reset pulses and means responsive to a predetermined number of reset pulses in said accumulator means for resetting said counter means.

4. The circuit defined in any one of claims 1, 2, or 3, further including manually operated tare means for resetting said counter means.

5. The circuit defined in any one of claims 1, 2, or 3, further including means for isolating the counter means and display means and responsive to said decoder means for zeroing said display means independently of said counter means during resetting of said counter means by said resetting means to prevent a count corresponding to drift from being displayed by said display means.

6. In a weighing scale of a type comprising a transducer for developing an analog signal proportional to magnitude of an applied weight to be displayed in a display, a source of clock pulses; analog to digital converter means for converting the analog weight responsive signal to a corresponding digital signal and means for displaying said digital signal; said converter means including means for sampling the analog input signal means for generating timing pulses having interpulse spacing proportional to analog signal magnitude, resettable counter means, means for controlling said counter means to successively upcount and downcount said clock pulses, and means responsive to said timing signals for latching an output count in said counter means at a display time whereat said count is proportional to the magnitude of an input analog voltage sample, and means for resetting said counter means:

a zero tracking method comprising the steps of monitoring the output of said counter means at the display times, generating a reset pulse when the monitored count has a magnitude corresponding to drift, accumulating said reset pulses and resetting said counter means upon accumulation of a predetermined number of said reset pulses.

7. A method of zero tracking in a dual slope type analog to digital converter, said converter including means for sampling the input analog signal, integrator means responsive to the analog signal samples for generating control pulses having interpulse spacings proportional to input analog signal magnitude, up-down counter means; clock means, means controlled by said control pulses for accumulating numbers of pulses generated by said clock means proportional to input analog signal magnitude, means for resetting said counter means, and display means for displaying contents of said counter means, comprising the steps of monitoring pulse counts applied by said counter means to said display means; detecting a low magnitude pulse count that is characteristic of drift and, in response, generating a reset pulse, accumulating said reset pulses and resetting said up-down counter means upon accumulation of a predetermined number of said reset pulses.

8. The method of claim 6 or 7, including the step of zeroing said display independently of said counter means during said resetting step to prevent a count corresponding to drift from being displayed by said display means.

9. A circuit fo digitally displaying the magnitude of an input analog signal comprising a source of clock pulses, means for generating a timing signal proportional to the instantaneous magnitude of the input signal, resettable up-down counter means responsive to the timing signals for successively upcounting and downcounting clock pulses and means responsive to said timing signal for latching an output count of said counter means; decoder means for monitoring the output count at a time whereat said count is proportional to the input signal magnitude; means for displaying said output count at said time and means responsive to said decoder means for resetting said counter means when said output count at said time has a value that is characteristic of drift, further including means for isolating the counter means and display means and responsive to said decoder means for zeroing said display means independently of said counter means during resetting of said counter means by said resetting means to prevent a count corresponding to drift from being displayed by said display means.

10. A method of zero tracking in a dual slope type analog to digital converter, said converter including means for sampling the input analog signal, integrator means responsive to the analog signal samples for generating control pulses having interpulse spacings proportional to input analog signal magnitude, up-down counter means, clock means, means controlled by said control pulses for accumulating numbers of pulses generated by said clock means proportional to input analog signal magnitude, means for resetting said counter means, and display means for displaying contents of said counter means, comprising the steps of monitoring pulse counts applied by said counter means to said display means; detecting a low magnitude pulse count that is characteristic of drift and, in response, resetting said up-down counter means, including the step of zeroing said display independently of said counter means during said resetting step to prevent a count corresponding to drift from being displayed by said display means.

* * * * *